Oct. 2, 1928.
A. C. HOPKINS
1,686,155
METHOD OF MAKING TIRE BEAD REENFORCING ELEMENTS
Filed May 25, 1927
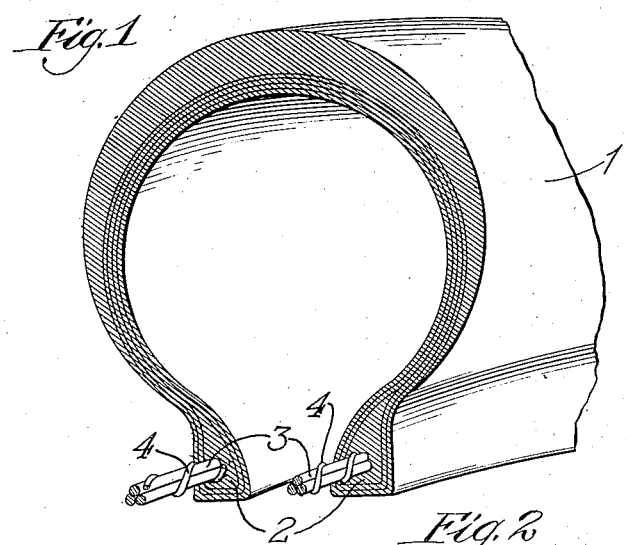
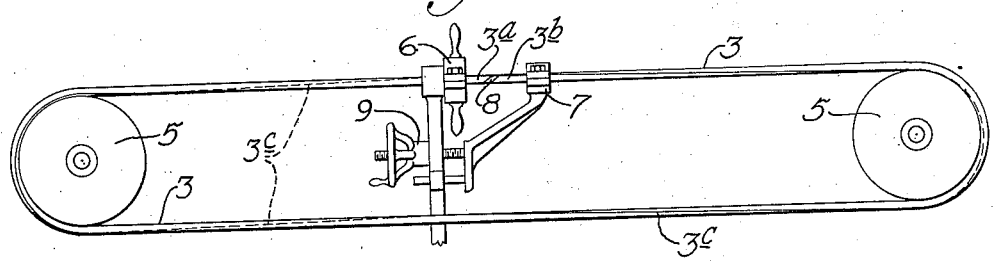
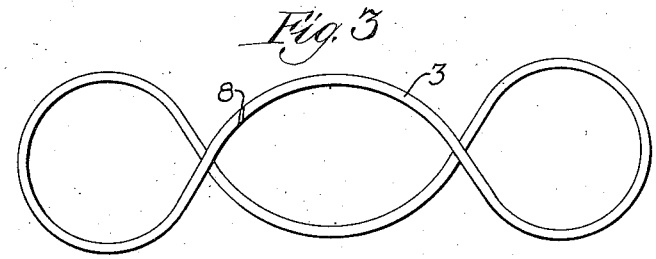
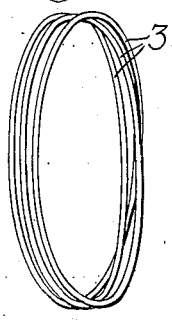 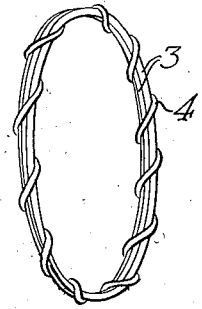
Inventor,
Arthur C. Hopkins,
by Dyrenforth, Lee, Chritton & Wiles,
Attys.

Patented Oct. 2, 1928.

1,686,155

UNITED STATES PATENT OFFICE.

ARTHUR C. HOPKINS, OF NILES, MICHIGAN, ASSIGNOR TO NATIONAL STANDARD COMPANY, OF NILES, MICHIGAN, A CORPORATION OF MICHIGAN.

METHOD OF MAKING TIRE-BEAD REENFORCING ELEMENTS.

Application filed May 25, 1927. Serial No. 194,142.

This invention relates to improvements in the method of making tire-bead re-enforcing elements and more especially such elements adapted for use in beads of pneumatic tire casings.

Among the features of my invention is the provision of a method of making such re-enforcing elements, which will considerably reduce the possible error. Each element must be the right length for the particular casing in which it is to be placed, and this length must be as exact as possible. By employing my method, the completed elements can be very quickly, easily, and cheaply made, and will be very exact as to size.

Other features and advantages of my invention will appear as I proceed with my specification.

In the drawings illustrating my invention and accompanying this specification, Fig. 1 is a view partly in section and partly in perspective of a pneumatic tire casing showing the re-enforcing elements in place in the beads, Fig. 2 is a view in side elevation showing the first step in the method of making the element, Fig. 3 is a similar view of the second step, Fig. 4 is a view in perspective showing the element after completion of the third step in the method of making, and Fig. 5 is a similar view showing the completed element.

As shown in the drawings, 1 indicates a conventional pneumatic tire casing provided with the usual bead 2 which is formed of a suitable rubber composition, the bead being of a cross-section corresponding to the tire in which it is desired to use the same.

Embedded in the bead proper 2 is a re-enforcement or re-enforcing element here shown as comprising an annulus made up of three convolutions or wraps of an endless tension member 3 which, for example, may consist of a wire. The several wraps or convolutions of wire tension member 3 are preferably bonded together by the bonding element 4 spirally wound about the same in separated turns. It is to be understood, of course, that fewer or more turns or convolutions of the tension member 3 may be employed, and that other means instead of the bonding element 4 may be used to hold the turns together.

The completed element or annulus is shown in Fig. 5 removed from the tire. As stated before, it is highly desirable that the length and size of the completed annulus or re-enforcing element, as shown in Fig. 5, be as exact as possible. I shall now describe my improved method for making such an element by which the error is reduced to a minimum.

It will be seen that if the wire 3 is formed into three turns, as shown in Fig. 4, before the ends are joined, that such three turns will all have to be made to the desired size. In the practice of my improved method, I join the ends of the wire 3 before the three loops or convolutions are formed. That is, I join the ends before the completed annulus as shown in Figs. 4 and 5, is made. In the practice of my improved method, I first form the wire 3 into a single loop or ring, as shown in Fig. 2, and then join the ends. I then bend it up into the annulus, as shown in Figs. 4 and 5 by first crossing it over to form three rings or loops, as shown in Fig. 3, and then bending these loops up into parallel relation to form the annulus as shown in Figs. 4 and 5. The final step is to apply the bonding element 4 or some other means for holding convolutions of the annulus together. It will be seen that by first making only a single loop and then joining the ends of the wire that much greater accuracy in the length of the completed annulus is obtained. In forming this single loop, the length is measured as exactly as possible and then when this single loop is folded up into three loops, any error in length that there might be is reduced to one-third, as it is distributed over the three loops of the completed annulus.

In forming the single loop of the wire in the first step as above described, I preferably stretch it over two drums 5, 5, which are separated the requisite distance so that the entire loop will have the proper length. The drums 5, 5 are adjusted for the correct separation, the wire is placed over them, as shown in Fig. 2, with the requisite tension and the ends are joined in any suitable manner. For example, the two ends as indicated by $3^a$ and $3^b$ may be held together by means of the clamps 6 and 7 as shown, and the ends suitably joined, for example, by welding or electric welding, as indicated at 8. The clamp 7 is adapted to move by means of the adjusting screw 9 in order to give the desired tension to the wire or tension member 3. After the single loop has been formed and the ends joined it is removed from the drums 5, 5, folded up into three loops as shown in Fig. 3, and these three loops folded up and bonded by means of the bonding element 4 to form the completed annulus.

Preferably, the wire 3 is given three twists as indicated diagrammatically by the spiral line 3ᵉ on the same. If thus twisted before the ends are joined, it is much easier to fold it up into three loops or convolutions, as such twists will cause it to form into three such convolutions or coils naturally.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. The method of making a tire-bead reenforcing element having a plurality of convolutions of a tension member, consisting of first forming such tension member in a single loop of requisite length, joining the ends, and then forming said single loop into a plurality of convolutions.

2. The method of making a tire-bead reenforcing element having a plurality of convolutions of a tension member, consisting of first forming such tension member in a single loop of requisite length, joining the ends, then forming said single loop into a plurality of convolutions, and then bonding the convolutions together.

3. The method of making a tire-bead reenforcing element having a plurality of convolutions of a tension member, consisting of first forming such tension member in a single loop of requisite length, joining the ends, then forming said single loop into a plurality of convolutions, and then bonding the convolutions together by spirally winding a bonding element about the same.

4. The method of making a tire-bead reenforcing element having a plurality of convolutions of a tension member, consisting of first forming such tension member in a single loop of requisite length, joining the ends, then forming said single loop into a plurality of convolutions, and then bonding the convolutions together by spirally winding a bonding element about the same in separated turns.

5. The method of making a tire-bead reenforcing element having a plurality of convolutions of a tension member, consisting of first forming such tension member in a single loop of requisite length, twisting the same a number of times substantially equal to the number of convolutions to be formed in the completed element, joining the ends together, and then forming the single loop into a plurality of convolutions.

6. The method of making a tire-bead reenforcing element having a plurality of convolutions of a tension member, consisting of first forming such tension member in a single loop of requisite length, twisting the same a number of times substantially equal to the number of convolutions to be formed in the completed element, joining the ends together, then forming the single loop into a plurality of convolutions, and then bonding the convolutions together.

7. The method of making a tire-bead reenforcing element having a plurality of convolutions of a tension member, consisting of first forming such tension member in a single loop of requisite length, twisting the same a number of times substantially equal to the number of convolutions to be formed in the completed element, joining the ends together, then forming the single loop into a plurality of convolutions, and then bonding the convolutions together by spirally winding a bonding element about the same.

8. The method of making a tire-bead reenforcing element having a plurality of convolutions of a tension member, consisting of first forming such tension member in a single loop of requisite length, twisting the same a number of times substantially equal to the number of convolutions to be formed in the completed element, joining the ends together, then forming the single loop into a plurality of convolutions, and then bonding the convolutions together by spirally winding a bonding element about the same in separated turns.

In testimony whereof, I have hereunto set my hand and seal this 19th day of May, A. D. 1927.

ARTHUR C. HOPKINS.